Figure 1:
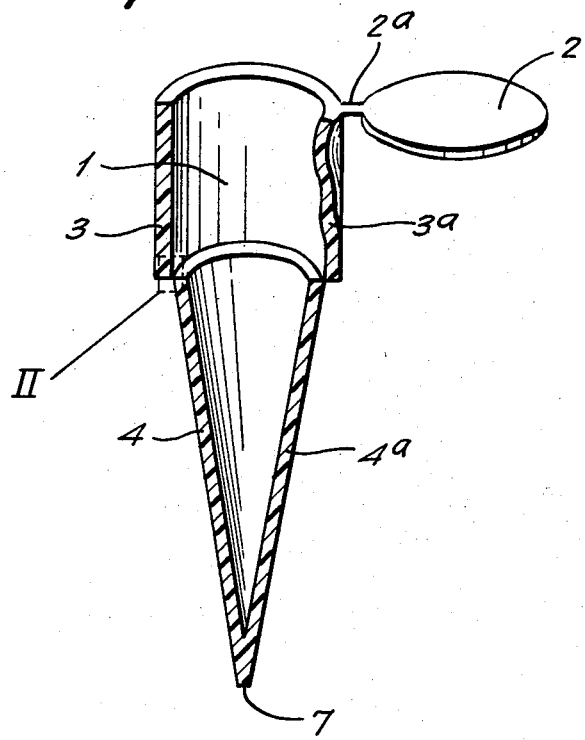

United States Patent
Linder

[15] 3,688,934
[45] Sept. 5, 1972

[54] PLASTIC CONTAINER AND METHOD OF MANUFACTURING THE SAME

[72] Inventor: Fritz Linder, Skarhamn, Sweden

[22] Filed: March 27, 1970

[21] Appl. No.: 23,250

[30] Foreign Application Priority Data

April 1, 1969    Sweden ..................... 4645/69

[52] U.S. Cl. .................. 215/32, 215/1 C, 215/46 A, 220/27
[51] Int. Cl. ........................... B65d 1/00, B65d 17/08
[58] Field of Search ..... 215/32, 42, 4 A, 1 C; 220/27, 220/54

[56] References Cited

UNITED STATES PATENTS

| | | |
|---|---|---|
| 3,318,477 | 5/1967 | Southwick, Jr. et al. .....220/27 |
| 3,083,858 | 4/1963 | Biedenstein ................215/32 |
| 3,499,572 | 3/1970 | Ruekberg ...................220/27 |
| 3,459,315 | 8/1969 | Labarre .....................215/42 |
| 3,317,274 | 5/1967 | McCormick................215/63 |
| 3,391,849 | 7/1968 | Horning......................215/32 |
| 3,248,000 | 4/1966 | Lurie..........................220/72 |

Primary Examiner—Joseph R. Leclair
Assistant Examiner—Stephen Marcus
Attorney—Albert M. Parker

[57]    ABSTRACT

A hermetically sealable plastic container is provided for storing purposes having at least one indication of fracture with a molecule orientation deviating from that of the rest of the container, so that the container may be opened extremely easily along said indication of fracture.

1 Claim, 3 Drawing Figures

Patented Sept. 5, 1972

3,688,934

2 Sheets-Sheet 1

FRITZ LINDER
INVENTOR.

BY Albert M. Parker

ATTORNEY.

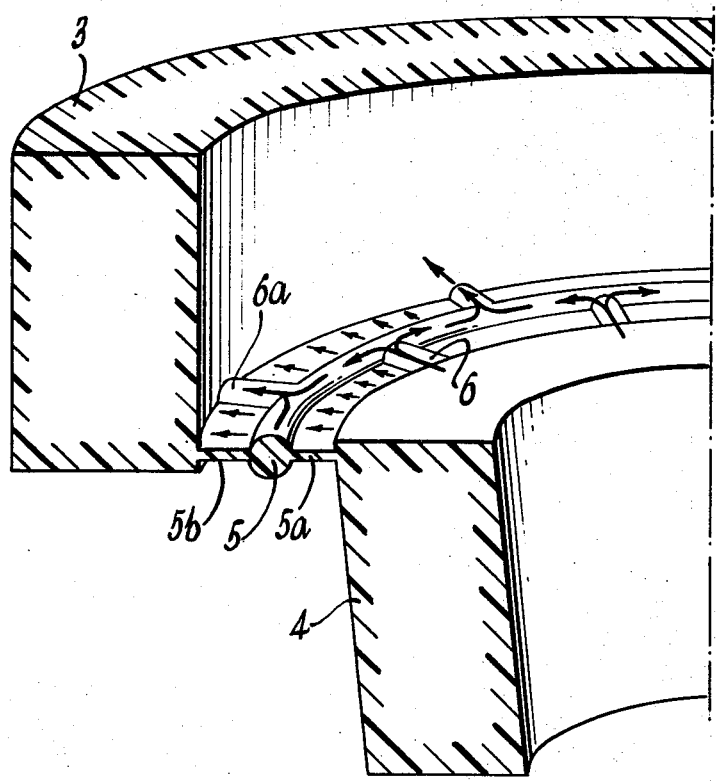

PLASTIC CONTAINER AND METHOD OF MANUFACTURING THE SAME

The present invention relates to a hermetically sealable plastic container and a method of manufacturing the same, and more particularly to containers for storing sterilized objects, such as medical articles. The invention will be described in the following with respect to this particular field of use. However, this does not exclude the possibility of the invention also being used in other fields.

It is known to store medical articles sterilized, for example, by means of radiation, for indefinite periods of time in hermetically sealable metal containers in order to prevent contamination of the sterile articles inside such containers. In order to avoid damage to the articles inside during transport and storage, such containers are made of relatively thick-walled material, i.e., they are relatively expensive to manufacture and are therefore intended for repeated use. For this reason, however, there is a serious disadvantage with these known containers since they can be unintentionally opened, for example by theater nurses preparing for an operation, and then be resealed by mistake and kept amongst unopened containers in readiness for the next occasion of use. It may thus occur that the contents of such containers are no longer sterile upon use.

Wrappings of thin plastic or paper, i.e., material permitting diffusion of gas or water vapor during sterilization, have also been proposed for sterilizing with gaseous media. Such wrappers are admittedly cheap to manufacture, but are also extremely fragile. Neither are they suitable for long periods of storage.

The object of the present invention is to provide a container which is cheap to manufacture, and thus suitable as expendable packing, and which is also made in such a way that it cannot be resealed once it has been opened, and in spite of these advantages, prevents transport damage and be used indefinitely for storage purposes.

This is achieved according to the invention by the container being manufactured in one piece by means of injection moulding and having at least one indication of fracture having a molecule orientation which deviates from that of the rest of the container.

According to a preferred embodiment of the invention the plastic molecules in the indication of fracture are orientated substantially transverse to the longitudinal direction of the container.

The indication of fracture thus divides the container into an upper and a lower part and comprises a central flange encircling the container, which is connected by means of side flanges along its entire circumference to the outer wall of the lower part and the inner wall of the upper part, the molecule orientation in the central flange being substantially perpendicular to the molecule orientation in the side flanges.

According to the invention such a container can be manufactured by means of injection moulding using a mould conventionally fitted to the shape of the container, in which in order to produce an indication of fracture at least encircling the container, the flow direction of the plastic compound is given a forced alteration within the area for the indication of fracture, so that the plastic molecules in the indication of fracture are orientated at an angle to the longitudinal direction of the container.

Figure 2:
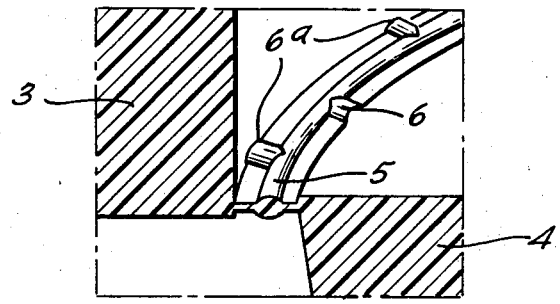

The invention will be described in the following with reference to one embodiment shown in the accompanying drawings where FIG. 1 is a longitudinal section through a container manufactured in accordance with the invention, FIG. 2 is an enlargement of the connection part designated II in FIG. 1, and FIG. 3 is a view similar to that of FIG. 2 and illustrating the orientation of molecules.

The container 1 shown in the drawings comprises a conical part 4, 4a, narrowing towards the bottom, and a cylindrical upper part 3, 3a connected to this part by means of a connecting portion acting as indication of fracture. The inner diameter of the upper part is in this case somewhat greater than the outer diameter of the upper end of the lower part. A lid 2 is attached by a tongue 2a to the upper part close to its upper edge. The lid 2 is intended to be welded or glued over the opening of the container after the objects have been placed in the container, so that a hermetic seal is achieved.

The connecting portion between the upper and lower parts of the container comprises a central, annular flange 5 which, by means of side flanges 5a, 5b along its entire circumference, is connected to the upper and lower parts of the container, respectively. The side flanges 5a, 5b are extremely thin.

The container shown in the drawings is extruded in one piece from a plastic material, preferably polystyrene, in a corresponding shape. The plastic compound is inserted at the lower end 7 of the container and flows over 4 and 4a to the connection portion situated between the upper and lower parts of the container. The connecting portion between the upper and lower parts of the container includes an annular central flange 5, from which spoke-like radially spaced connecting parts 6 and 6a extend to join the central flange 5 to the lower and upper parts of the container respectively. In the manufacture of the container the connecting parts 6 provide paths for the flow of most of the plastic material which is to form the central flange 5. The flowing plastic follows the path of least resistance as shown by the arrows in FIG. 3. The connecting parts 6a are staggered with respect to the connecting parts 6, so during manufacture most of the flowing plastic material travels through the parts 6, around an arc through the central flange 5, and out by way of the parts 6a. Thus, upon hardening of the plastic material, the molecules in the connecting parts 6 and 6a are oriented in a direction generally perpendicular to the molecules in the central flange 5 as shown in FIG. 3. By the use of a suitable mold, (not shown), which constrains the flow of the plastic material in the manner just described, the desired alteration in flow direction of the plastic compound in the flange 5 is achieved. The annular flange 5 is thus connected along its entire circumference to the respective upper and lower parts by relatively thin flange connections 5a, 5b, the flange connections 5a and 5b being generally arcuate in shape and serving to connect the central flange 5 to the upper and lower parts of the container at ever point around the circumference of the container except at the locations of the connecting parts 6 and 6a.

Due to the displacement between connecting parts 6 and 6a, respectively, a forced alteration in the flow direction of the plastic compound in the flange itself is achieved and since injection-moulded plastic material, as is known, can only with great difficulty be broken across the flow direction, but can on the other hand easily be broken parallel to the flow direction, a molecule orientation is produced in the indication of fracture which permits the container to be opened extremely easily. Since the connecting parts 6 the central flange 5 are relatively large, a forced flow is achieved through these to the central flange and the plastic compound thus flowing into the central flange is forced to flow in the longitudinal direction of the flange in order to leave the flange through the connecting parts 6a connected the upper part of the container. The orientation of the plastic molecules in the flange after the plastic material hardens will thus be in agreement with the flow direction substantially parallel to the circumference of the flange. Because the generally arcuate side flanges 5a, 5b are extremely thin, during the molding operation flow through these side flanges is very limited compared to the amount of material flow through the connecting parts 6 and 6a and the central flange 5. The arrows in FIG. 3 illustrate this flow. The material flow in the side flanges 5a and 5b is naturally in the same direction as the flow through the connecting parts 6 and 6a, that is, radially outward. Accordingly upon hardening the molecule orientation in the side flanges 5a and 5b is generally perpendicular to that in the central flange 5.

The lid 2 is filled through the flange 2a. Strain on the flange 2a when the lid is moved to the sealing position will therefore be transverse to the flow direction of the plastic compound, which prevents the flange 2a from being broken when the lid is closed. The lid 2 can thus be extruded in one piece with the container, which considerably reduces the manufacturing costs.

The invention is not limited to the embodiment shown in the drawings but can be varied in many ways within the scope of the following claims. For instance, the container may have several indications of fracture spaced along its length, and both the shape of the indication of fracture and the cross-section of the container may be arbitrarily altered. However, it is important that the orientation of the plastic molecules aimed at according to the invention is achieved in the indication of fracture.

What I claim is:

1. A container manufactured in one piece by means of injection moulding and having at least one indication of fracture with a molecule orientation deviating from that of the rest of the container, wherein said indication of fracture divides said container into an upper part and a lower part and comprises a substantially annular central flange encircling said container, radially spaced integrally formed connecting parts connecting said central flange to an inner wall of said upper part and an outer wall of said lower part, the parts connecting said central flange to said upper part being radially spaced from the parts connecting said central flange to the lower part, said connecting parts having the molecules therein oriented substantially perpendicular to the molecules of the central flange near the points of connection, said central flange at every point between said spaced connecting parts being integrally connected to said upper and lower parts by arcuate portions which are relatively thinner than said connecting parts whereby in the manufacture of the container the connecting parts provide a forced alternation of the flow direction of the plastic mass in the flange.

* * * * *